March 31, 1959  F. D. BERGSTEIN ET AL  2,879,933
BOTTOM CLOSURES FOR LINED CARTONS
Filed March 18, 1953  6 Sheets-Sheet 1

INVENTORS.
FRANK D. BERGSTEIN
AND ROBERT W. NERENBERG,
BY Allen & Allen
ATTORNEYS.

March 31, 1959  F. D. BERGSTEIN ET AL  2,879,933
BOTTOM CLOSURES FOR LINED CARTONS
Filed March 18, 1953  6 Sheets-Sheet 2
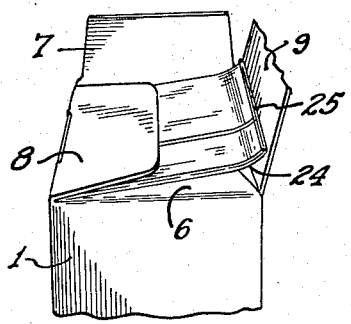
FIG.9.
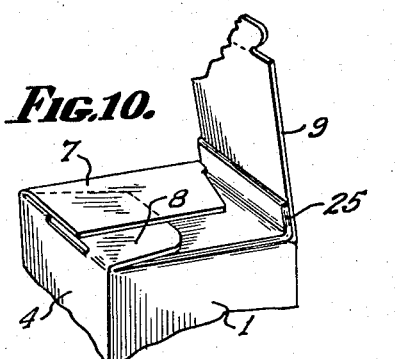
FIG.10.
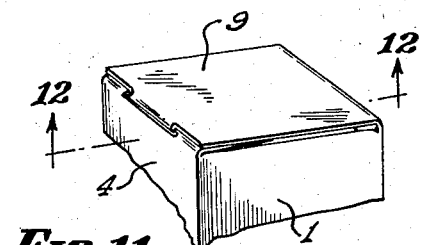
FIG.11.
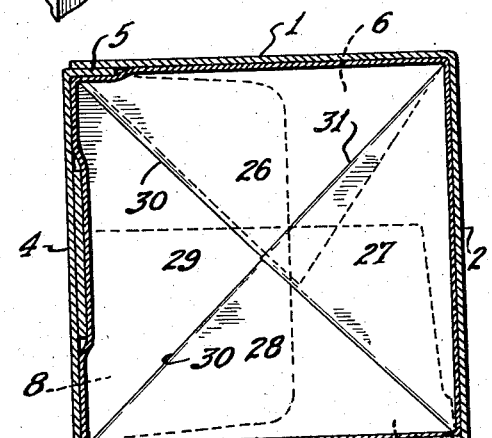
FIG.12.
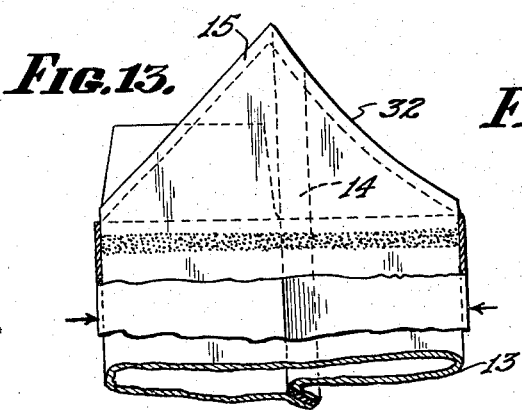
FIG.13.
FIG.14.
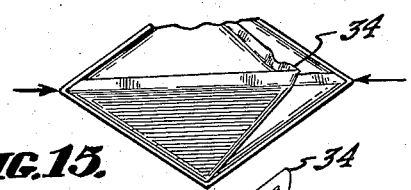
FIG.15.
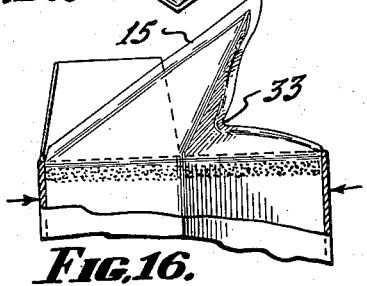
FIG.16.
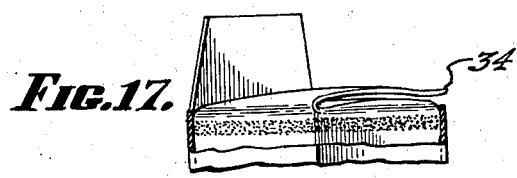
FIG.17.
INVENTORS.
FRANK D. BERGSTEIN
AND ROBERT W. NERENBERG,
BY
Allen & Allen
ATTORNEYS.

INVENTORS.
FRANK D. BERGSTEIN
AND ROBERT W. NERENBERG,
BY
ATTORNEYS.

INVENTORS.
FRANK D. BERGSTEIN
AND ROBERT W. NERENBERG.
BY Allen & Allen
ATTORNEYS.

United States Patent Office 2,879,933
Patented Mar. 31, 1959

2,879,933

BOTTOM CLOSURES FOR LINED CARTONS

Frank D. Bergstein, Hamilton, and Robert W. Nerenberg, Middletown, Ohio, assignors to The Bergstein Packaging Trust Application March 18, 1953, Serial No. 343,184

13 Claims. (Cl. 229—14)

Our invention relates to packaging structures made up of an outer paperboard carton and an inner liner, and in particular relates to improvements in the bottom closures of such structures.

Cartons of the general character contemplated herein have come into widespread use and are generally of tubular form with enclosing body walls having closure flaps at the ends thereof. The liner is also a tubular structure of flexible sheet material projecting beyond the body walls at one or both ends of the carton. The walls of the liner are adhered to the body walls of the carton so that when the carton is squared up or erected the liner is likewise squared up and hence opened for filling.

The structure is shipped to the carton user in the knocked-down or flat-folded condition, and preferably the liner has already been closed at the bottom, forming in effect a bag. Since the closed end of the liner projects beyond the carton body walls, the carton user has to fold in the projecting end of the liner and dispose it within the confines of the carton body before the carton flaps can be closed. This operation, as well as that of infolding the closure flaps, is time-consuming and inconvenient if done by hand; and if done by machine requires a duplication of folding elements or a duplication of the use of the folding elements since both the bottom and top of each package must be folded and closed, the top being additionally seamed prior to folding and closing.

In particular, a four-panel carton, i.e., one having four enclosing body walls, presents a special problem in the erection and folding of a closed liner end since a square bottom closure of the satchel bag type cannot be used as it is in a six-wall carton wherein the main body walls collapse one on the other. In a four-panel carton the body walls are collapsed in offset relation and the liner is, in effect, twisted or turned to the erected or squared up condition; and in such structures, extreme difficulty has been encountered in accurately folding the projecting sealed bottom end of the liner to secure a satisfactory folded end.

A marked advance in the positive folding of the bottom closure of a carton liner of the four-wall variety is taught by our coworker, John W. Wilson, in his Patent No. 2,516,820, entitled Lined Carton, wherein he teaches a lining structure which departs from those theretofore used in that the seam forming the bottom closure is not rectilinear, but rather is shaped or angular, the extending end of the liner being in essence triangular in shape. When this liner is erected or squared up, a self-folding action occurs in that the liner bottom—the edges of which are seamed—will begin to kink or bend along one of the sides or legs of the triangle; and as the squaring up action proceeds, a peak is formed which itself is folded down so that all parts of the liner end approach a horizontal plane. Thus a self-erecting or self-folding end closure is provided for the liner bottom to the elimination of the hand manipulations formerly required to fold the liner end.

The instant application relates to improvements in the formation of such self-folding liner ends to attain more positive and accurate folding of the liner parts when the carton with which the liner is associated is squared up.

It is a principal object of our invention to provide carton end closure elements which coact with the sealed liner end to fold both the liner and the closure flaps, thereby still further simplifying the operations necessary to erect the flat folded structure.

Yet another object of our invention is to provide packaging structures having self-folding bottom elements which will always fold in the same direction and cannot fold in the wrong way or buckle at the wrong point.

These and other objects of our invention which will be set forth hereinafter or will be apparent to one skilled in the art upon reading these specifications, we accomplish by those structures and arrangements of parts of which we shall now describe certain exemplary embodiments. Reference is made to the accompanying drawings, wherein:

Figures 7, 8 and 9 are partial perspective views showing stages in the erection of the carton and illustrating the folding action which occurs in the liner bottom.

Figure 10 is a partial perspective view showing the infolding of the carton end closure flaps over the folded liner.

Figure 11 is a partial perspective view showing the fully erected and closed carton end.

Figure 12 is a sectional view taken along the line 12—12 of Figure 11.

Figure 13 is a side elevation with parts broken away and parts in section of a modified form of liner wherein one of the legs or sides of the triangular bottom is curved.

Figure 14 is a plan view of the package structure shown in Figure 13.

Figure 15 is a partial plan view of the structure shown in Figure 13 in partially erected condition.

Figure 16 is a partial elevational view with parts in section of the end closure in the position illustrated in Figure 15.

Figure 17 is a partial elevation with parts in section of the fully folded bag bottom.

Figure 4:
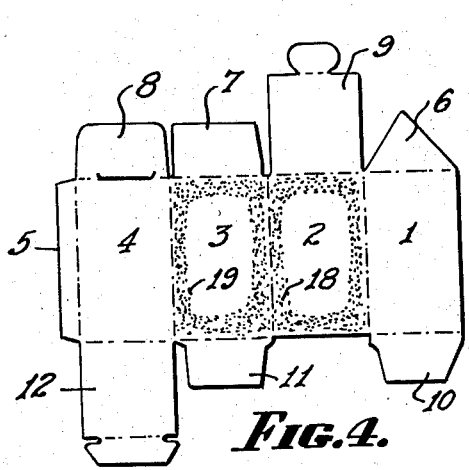
Figure 4 is a plan view of a carton blank with which the liner of Figure 1 may be associated.

Referring first to Figure 4 of the drawings, we have shown a preferred carton construction having body walls 1, 2, 3, and 4 and a glue flap 5. Closure flaps 6, 7 and 8 are shown at the ends of body walls 1, 3 and 4, respectively, while the body wall 2 carries a tuck flap 9. The opposite end of the carton, which will be the top of the completed package, is provided with short flaps 10 and 11, and a full size tuck flap 12. The flap arrangement for the top end of the carton is exemplary only and other flap formations may be employed including the well known seal-end flap construction.

Figure 1:
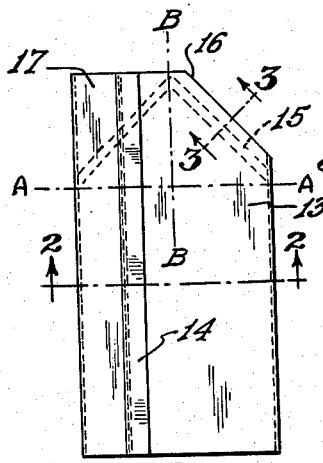
Figure 1 is a plan view of a preferred form of liner for our packaging structures.

The liner for use with the carton just described is illustrated in Figure 1 of the drawings and comprises a tubular body 13 made of any suitable flexible sheet material or laminated sheet material. The liners hereinafter described may be cut from sheets and individually tubed, or preferably, the flexible material in strip form may be tubed about a former with an appropriately secured longitudinal seam 14. The bag tubes thus formed will be cut apart into suitable lengths.

Our lining structures are closed at one end—which will be the bottom—by the application of adhesive or the heat sealing of a thermoplastic substance constituting or carried by the flexible material. As seen in Figure 1, the bottom end of the liner 13 is provided with a closure seam 15 which is generally rectangular in configuration with the legs of the angle located at about 45° to the longitudinal axis of the liner tube. In addition, the extending end of the liner lying to one side of the longitudinal axis is cut away, as at 16, along a line paralleling the adjacent leg of the closure seam 15. However, on the opposite side of the liner, the triangular liner portions 17 lying beyond the closure seam 15 is not cut away but rather is retained as a stiffening or reinforcing member to reinforce the seam and thereby make the one leg of the seam effectively stronger than the other. As seen in Figure 1, the dot-dash line A—A separates what will be the exposed end portion of the liner from the body thereof; and the dot-dash line B—B establishes the longitudinal axis of the bag liner.

Figure 2:
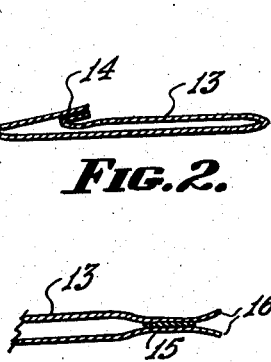
Figure 2 is a sectional view taken along the line 2—2 of Figure 1.
Figure 3:
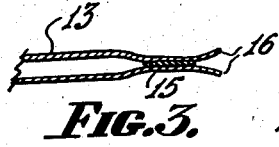
Figure 3 is a sectional view taken along the line 3—3 of Figure 1.

As seen in Figure 2, the longitudinal or long seam 14 is preferably formed by bringing the edges of the liner material together and securing them in face-to-face relation to form an upstanding fin-type seam which is then folded-over. It will be understood, however, that other types of seam formations may be used. In the embodiment illustrated, the long seam is offset with respect to the longitudinal axis of the liner and extends into the liner portion 17. Also, as seen in Figure 3, the cut edges 16 of the liner is spaced from the closure seam 15 by a distance of approximately 5/16 of an inch rather than abutting the closure seam area.

Figure 5:
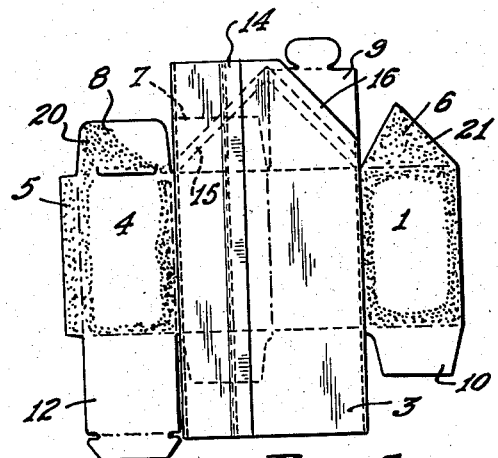
Figure 5 is a plan view similar to Figure 1 showing the liner in position on the blank.

In Figure 5 the liner 15 is shown positioned on the carton blank with the bottom forming portion of the liner overlying the flaps 7 and 9, the body of the liner being secured to body walls 2 and 3 of the carton by means of the adhesive areas 18 and 19 shown in Figure 4, which preferably extend about the perimeter of those walls. The carton body is then tubed about the liner by infolding body walls 1 and 4, the sequence of folding of the said body walls being determined by whether it is desired to have the glue flap 5 lie to the inside or outside of the body wall 1 which it contacts. Adhesive will be applied to the body walls and the glue flap as indicated by the shaded area in Figure 5 of the drawing; and upon infolding of parts the structure assumes the condition shown in Figure 6 of the drawings.

Figure 6:
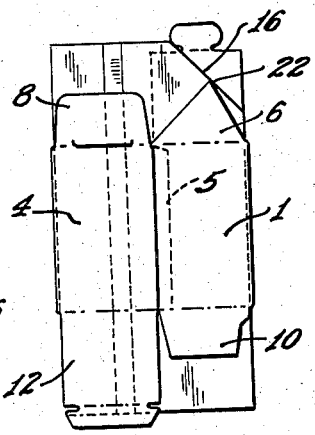
Figure 6 is a plan view of the tubed lined carton.

In addition to the application of adhesive to the body walls and glue flap, a triangular area of adhesive 20 will be applied to closure flap 8, the edge of the adhesive area 20 being adapted to coincide with the adjacent leg of closure seam 15. Closure flap 6, which is of triangular configuration, is also coated with adhesive, as indicated by the shaded area 21. As seen in Figure 6, the configuration of closure flap 6 is such that its apex 22 coincides substantially with the cut edge of the liner 16.

Figure 7:
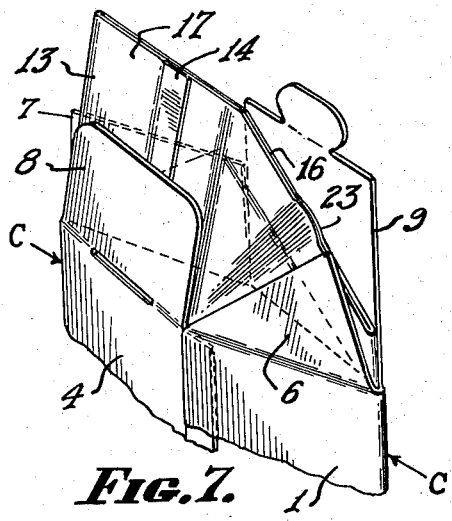
Figure 8:
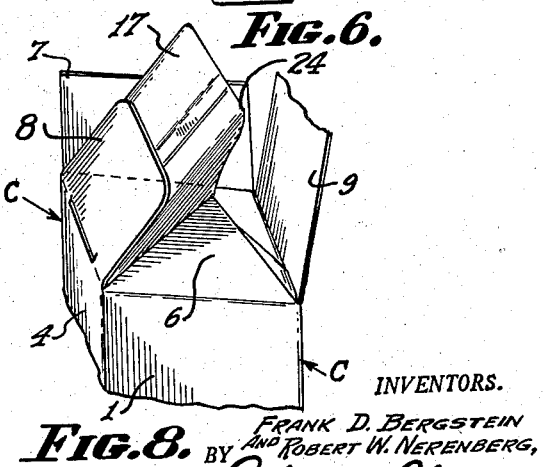
Figure 19:
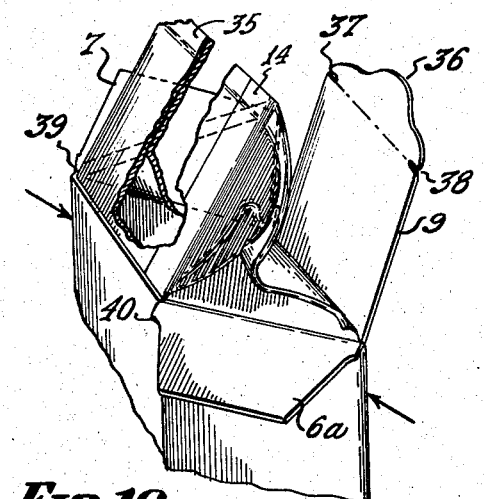
Figure 19 is a partial perspective view during the erection of a carton structure incorporating the liner of Figure 18.
Figure 18:
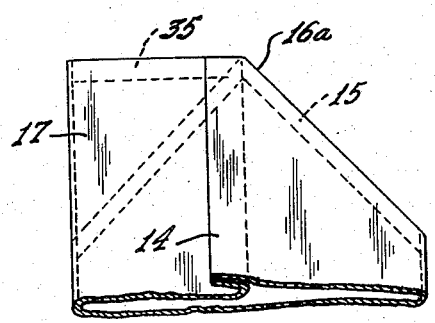
Figure 18 is a partial elevational view of a liner wherein the extending edge is treated with adhesive.
Figure 21:
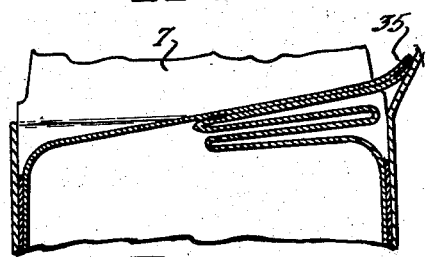
Figure 21 is a sectional view taken along the line 21—21 of Figure 20.

The structure is shipped to the user in the knocked-down or flat-folded form shown in Figure 6, and the user erects the carton for filling by applying pressure to the opposite side edges of the structure to cause it to assume the erected condition, the application of pressure to erect the walls being indicated by the arrows C seen in Figures 7 and 8. As the structure is erected or squared up, a self-folding action occurs in the liner which is assisted by the closure flaps 6 and 8 which are secured thereto. The liner seam will begin to kink or bend along the side adjacent the cut edge 16, which is the weaker of the two seam legs, as shown at 23 in Figure 7. As the squaring up action proceeds and the end portions of the liner come down more nearly into a horizontal plane, a peak forms, as most clearly seen at 24 in Figure 8. The final condition of the liner is shown in Figure 9, wherein the peak has folded itself down and all parts of the line approach a horizontal plane. In this condition all edge portions of the liner are in such position that the remaining flaps or end closure members of the carton may be folded without other manipulation of the liner, the closure flaps, such as the flaps 6 and 8 which are secured to the liner, having been automatically infolded as the liner end assumes the horizontal condition. The final folding steps for completing the end closure are the infolding of flap 7, as seen in Figure 10, followed by the infolding of closure flap 9 to form the completed end closure, as seen in Figure 11.

The reasons why the liner will fold in the manner just described are twofold: (1) the seamed end of the liner first bends over kinks along its weaker side—which is along the cut edge 16—the other or opposite side of the closure seam being the stronger since it is reinforced by the liner portion 17 and the long seam 14; and (2) once the liner begins to kink or bend, as at the point 23, it carries the closure flap 6 with it, the closure flap providing a folding edge or guide about which the liner automatically folds as the squaring-up proceeds.

Where, as seen in Figure 9, an end portion of the liner, such as the portion 25, extends beyond the cross-sectional confines of the carton, the arrangement is such that the outermost closure flap 9 will act, when infolded, to reversely fold such portion in the manner best seen in Figure 10. The folding of the liner end in the manner just described results in the formation of a neat, substantially co-planar end closure which, when viewed from the interior, as seen in Figure 12, presents four substantially equal triangular areas of neatly folded liner material, indicated at 26, 27, 28 and 29 in Figure 12. The edge 30, it will be noted, is defined or formed by an edge of the triangular closure flap 6; and the edges 30 and 31 are defined by the legs of the closure seam 15.

In Figures 13 through 17 of the drawings, we have illustrated a modification of our invention wherein folding of the liner end is again enforced by making one side of the liner weaker than the other. In this instance the kinking or buckling of the liner in the desired direction is effected by bowing or curving one leg of the closure seam, as at 32, which results in a greater length in one of the legs of the angle then in the other. In a liner end so formed the longer or bowed leg of the angle is effectively the weaker, and it will bend first, as at 33, in the manner seen in Figure 16. The kinking or buckling at 33 provides a peak 34 which, upon the erection of the carton, folds down flat in the manner best seen in Figure 17.

Figures 18 through 22 illustrate a carton and liner construction wherein the closure seam 15 is formed in much the same manner as the liner of Figure 1, excepting the liner portion 17 is additionally reinforced or stiffened by means of the adhesively secured or heat-sealed area 35 extending along the top edge of liner portion 17. In the embodiment illustrated the cut edge 16a of the liner coincides with the outermost edge of the closure seam; and the closure flaps, such as the flaps 6 and 8, are free of adhesive attachment to the liner end. In fact, the closure flap 6a is a conventional four-sided flap, and the closure flap 8 has been omitted entirely. The outer closure flap 9 carries a tuck-in extension 36 having slots 37 and 38 adapted to engage between projecting edge portions 39 and 40 of closure flaps 6a and 7, respectively, to maintain the end closure elements in the closed position.

Figure 23:
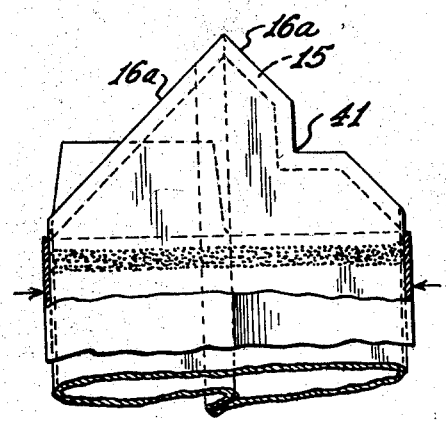
Figure 23 is an elevation view with parts in section and others broken away of another form of liner bottom closure reinforced as to one side edge to enforce folding in a given direction.
Figure 24:
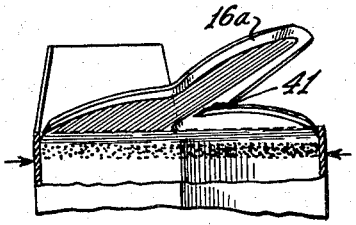
Figure 24 is a side elevation with parts broken away showing the structure of Figure 23 in the partially folded condition.

In Figure 23 we have illustrated a liner structure wherein one leg of the closure seam 15 is interrupted by means of the notch or cut-out 41 which effectively weakens the leg so as to cause the closure seam to kink or buckle in the area of the cut-out. The seam will, of course, follow the cut-out in the manner illustrated. Where the seam is notched, we have found that the end of the liner may be cut, as at 16a, so as to coincide with the outer edges of both legs of the closure seam to the elimination of the liner portion 17.

Figure 25:
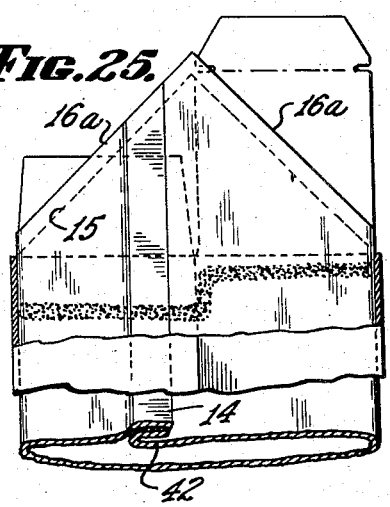
Figure 25 is a side elevational view with parts in section and others in cut-away condition showing another carton-liner combination.
Figure 26:
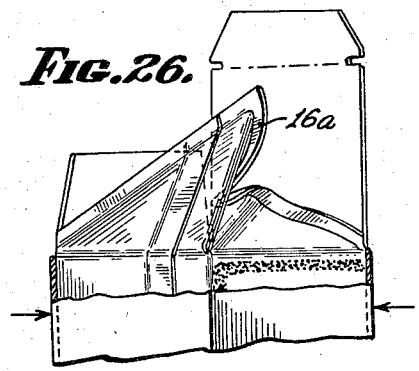
Figure 26 is a side elevation with parts in section showing the structure of Figure 25 in partially erected condition.

In Figures 25 and 26 we have illustrated another liner construction wherein the liner edges 16a coincide with the closure seam 15 as to both legs of the angle. In this instance, however, one leg of the angle is strengthened by means of the long seam 14 which is offset to one side of the longitudinal axis of the liner. In the illustrated embodiment, the seam is folded in the direction of the longitudinal axis and is adhesively or otherwise secured to the liner, as indicated at 42.

Figure 27:
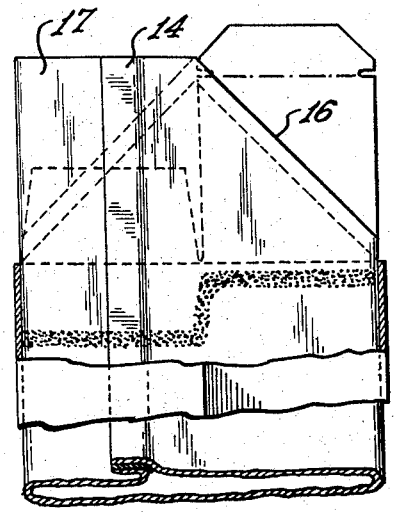
Figure 27 is a side elevation with parts in section and others broken away showing a modified form of the liner illustrated in Figure 25.
Figure 28:
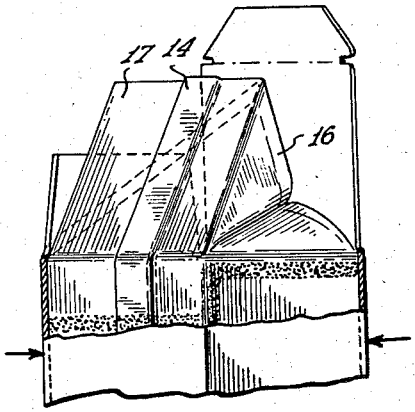
Figure 28 is a side elevational view with parts in section and others broken away of the structure of Figure 27 in partially folded condition.

Figures 27 and 28 illustrate the joint use of the longitudinal seam 14 and the liner portion 17 to reinforce or strengthen one leg of the closure seam, the construction being similar to that illustrated in Figure 1 excepting that the cut edge 16 coincides with the adjacent leg of the closure seam. The construction differs also in that the long seam is folded outwardly with respect to the longitudinal axis of the liner rather than toward it, as in Figure 1.

Figure 20:
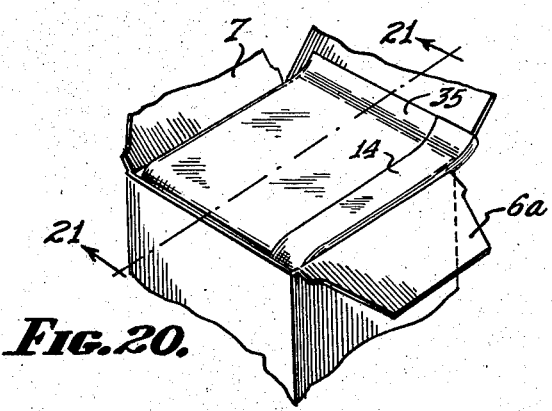
Figure 20 is a partial perspective view similar to Figure 19 showing the carton structure in the fully erected condition.
Figure 22:
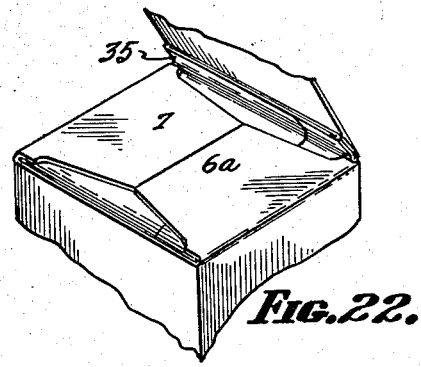
Figure 22 is a partial perspective view showing the carton of Figure 20 with some of the end closure flaps in infolded condition.
Figure 29:
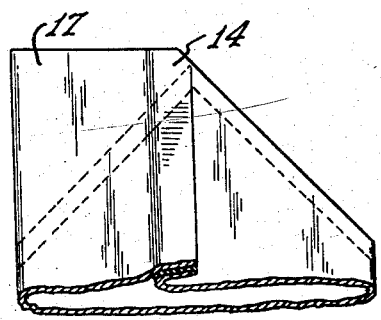
Figure 29 is a partial elevational view of a liner similar to that of Figure 27 excepting for the location of the long seam.
Figure 30:
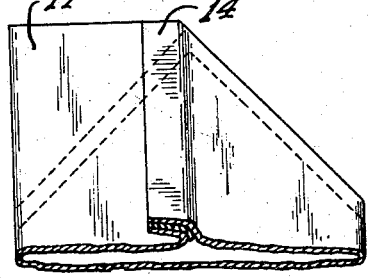
Figure 30 is a partial elevational view similar to Figure 29 but with the direction of the long seam reversed.
Figure 31:
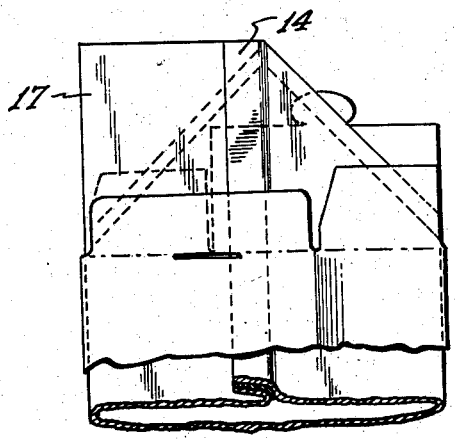
Figure 31 is a partial elevational view with parts broken away of a rectangular carton employing the liner illustrated in Figure 30.
Figure 33:
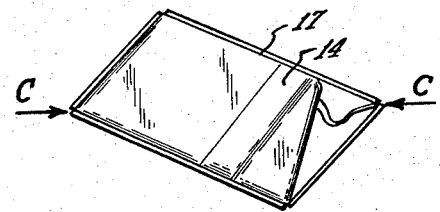
Figure 33 is a plan view of the carton structure shown in Figure 32.
Figure 32:
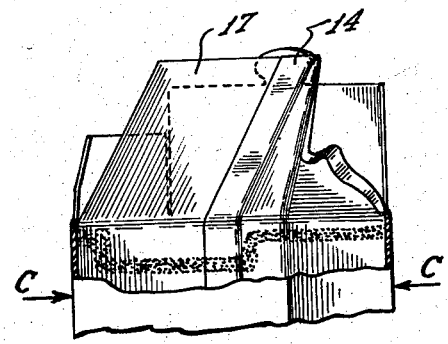
Figure 32 is a partial elevational view with parts broken away of the rectangular carton and liner of Figure 31 in partially erected condition.
Figure 34:
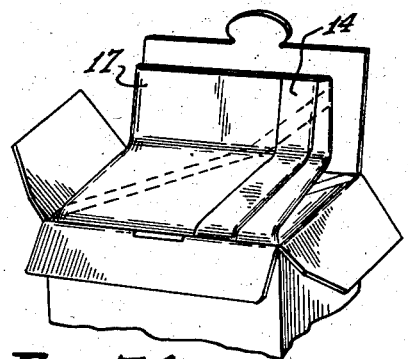
Figure 34 is a partial perspective view of the fully erected structure of Figure 31 prior to infolding of the closure flaps.

Figures 29 and 30 illustrate liner closures similar to that of Figure 20 excepting as to the position of the longitudinal or long seam. In Figure 29 the free edge of the long seam is folded inwardly and lies along the longitudinal axis of the liner; whereas in Figure 30, the base of the long seam lies along the longitudinal axis of the liner and the seam is folded outwardly in the direction of the liner portion 17. Either construction, however, results in the strengthening of one leg of the closure seam and results in the enforced folding of the liner end in the direction of the weaker leg.

Figures 31 through 34 show the liner structure of Figure 30 as it would be applied to a rectangular carton having adjacent side walls of unequal width rather than side walls of equal width. The construction is indicative of the fact that any or our liner constructions may be used with cartons which are rectangular as well as square in cross-section.

Figure 35:
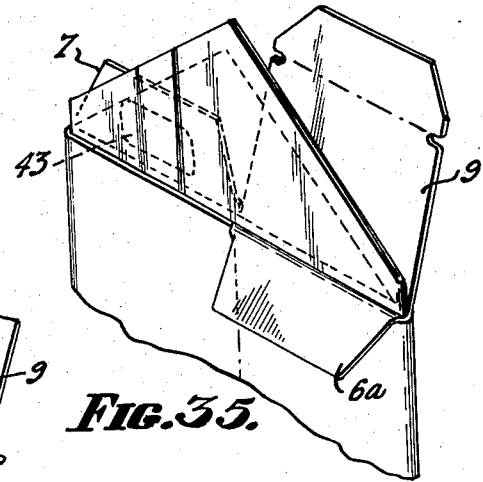
Figure 35 is a partial perspective view illustrating a package structure employing the liner of Figure 27 wherein the liner is adhered to one of the closure flaps.
Figure 36:
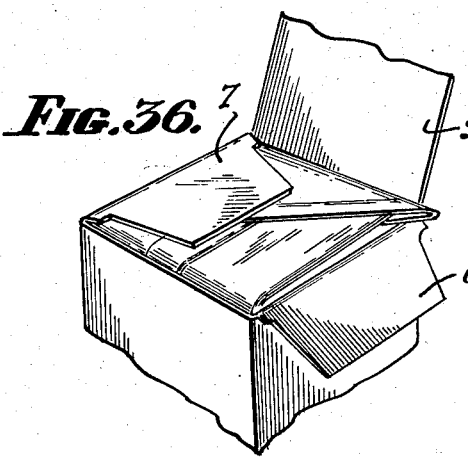
Figure 36 is a partial perspective view of the carton of Figure 35 in the erected condition with the adhered closure flap in infolded condition.

Figure 35 illustrates the liner of Figure 25 applied to a carton structure having but three closure flaps 6a, 7 and 9, all of conventional configuration. In the embodiment illustrated, the closure flap 7 is secured to the liner by the adhesive area 43 so as to produce the automatic infolding of the flap 7 upon the squaring up of the carton, in the manner best seen in Figure 36.

Figure 37:
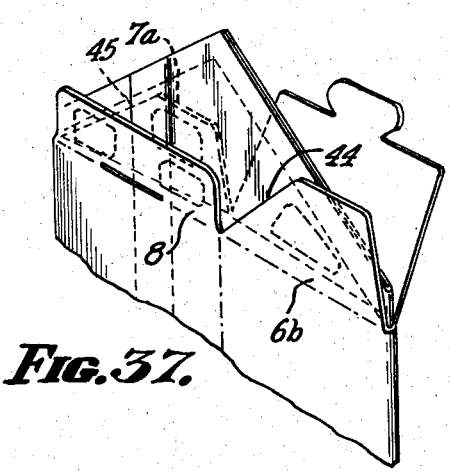
Figure 37 is a partial elevational view of yet another form of package structure wherein the liner is adhered to at least three of the closure flaps.
Figure 38:
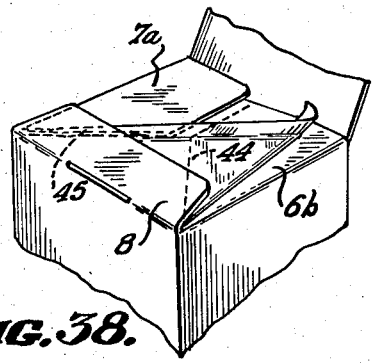
Figure 38 is a partial perspective view showing the structure of Figure 37 in erected condition prior to the closing of the outermost closure flap.

Figure 37 shows a carton structure having closure flaps 6b, 7a and 8 all of which are adhesively secured to the liner, the flap 6a having an angularly related edge 44 and the flap 7a an angularly related edge 45, both of which act, during the erection of the carton, to enforce the folding of the liner end. The folding brings the closure flap to the position illustrated in Figure 38.

Figure 39:
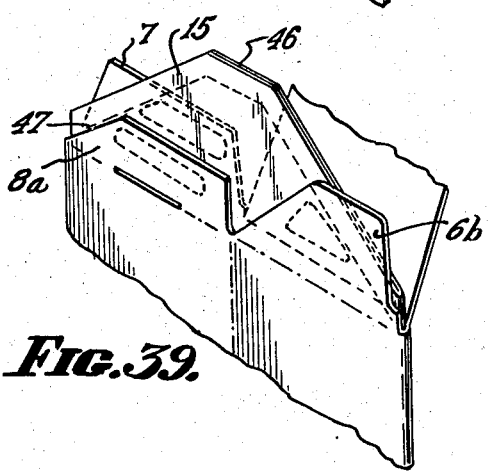
Figure 39 is a partial perspective view similar to Figure 37 but illustrating yet another form of liner.
Figure 40:
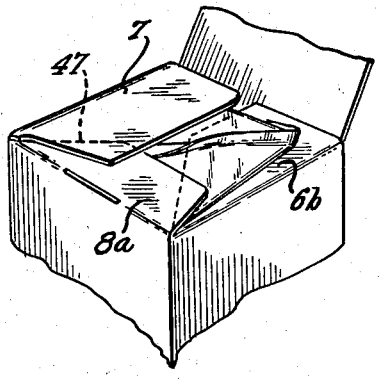
Figure 40 is similar to Figure 38 and shows the liner structure of Figure 39 in the folded condition.

Figures 39 and 40 show a carton construction and liner similar to that of Figure 37 excepting that the peak or top of the angle is cut away, as at 46, so as to permit the entire area of the folded liner to lie within the cross sectional confines of the carton body walls, without supplementary folding of an extending portion of the liner, as in Figure 10, for example. In addition, referring again to Figure 39, the flap 7 is of conventional configuration whereas the flap 8a has a side edge thereof cut off, as at 47, so as to coincide with the adjacent leg of the closure seam.

Modifications may be made in our invention without departing from the spirit of it. From the foregoing illustrative examples, it will be apparent that numerous combinations of liner end constructions and carton closure flaps may be employed in the furtherance of the objectives of our invention without departing from the spirit of it. Also, it will be apparent that a wide latitude is permissible in the selection of materials both for the carton and the liner, inclusive of both coated and uncoated papers, the non-fibrous films of commerce, and foils, either suitably coated or laminated in ways well known in the art.

Having thus described our invention in a number of exemplary embodiments, what we desire to secure and protect by Letters Patent is:

1. A knock-down carton comprising body walls in articulation in flat, tubular form, and a flat, tubular liner therein adhesively secured to the body walls of the carton and having an end portion projecting beyond an end of the carton body, the projecting portion of the liner comprising an end closure having a V-shaped closure seam consisting of two substantially angularly related seam portions extending from points at the edges of the flat liner adjacent the ends of the carton body walls toward a median point furthest removed from the ends of the carton body walls, the said median point lying on the longitudinal axis of the tubular liner, and stiffening means lying wholly to one side of the longitudinal axis of the liner for stiffening one side of the liner end closure so that it will be effectively stiffer than the side of the end closure lying to the opposite side of the said longitudinal axis, whereby upon joint erection of said carton body and liner, said end closure will be caused to first buckle and fold in the direction of the more flexible side thereof.

2. The carton structure claimed in claim 1 wherein said stiffening means comprises a longitudinal seam lying to one side of the longitudinal axis of the liner and extending through the said end closure.

3. The carton structure claimed in claim 2 wherein the said longitudinal seam comprises opposite edge portions of the liner secured together in face-to-face relation with the secured together portions folded over to lie along the outer surface of the liner.

4. The carton structure claimed in claim 3 wherein the folded over portions of the longitudinal seam are adhesively secured to the underlying surface of the liner.

5. The carton structure claimed in claim 1 wherein said stiffening means comprises a section of the liner extending freely beyond the portion of the closure seam lying to one side of the longitudinal axis of the liner.

6. The carton structure claimed in claim 5 wherein the extending section is triangular and comprises a corner portion of an initially rectangular liner.

7. The carton structure claimed in claim 6 wherein the end portion of the liner on the side of the longitudinal axis opposite said extending section is tapered along a line paralleling the closure seam and lying just beyond the said seam.

8. The carton structure claimed in claim 7 wherein said stiffening means includes a longitudinal seam lying to one side of the longitudinal axis of said liner and extending through said end closure and the stiffening section extending therebeyond.

9. A knock-down carton having enclosing body walls in tubular form and a tubular liner adhered to said body walls so as to be erected as said carton is erected, said liner having an end closure projecting beyond the ends of the carton body walls, said end closure having an end closure seam made up of two angularly related seam portions the outer ends of which approach the ends of the carton body walls and the inner ends of which extend outwardly from the ends of the carton body walls and approach each other to define a generally V-shaped closure seam the apex of which lies along the longitudinal axis of said liner, stiffening means lying wholly to one side of the longitudinal axis of the liner for stiffening one side of the liner end closure so that it will be stiffer than the side of the end closure lying to the opposite side of the longitudinal seam, whereby upon joint erection of the carton body and expansion of the liner, said end closure will be caused to first buckle and fold in the direction of the unstiffened side thereof, and end closure flaps articulated to the ends of said carton body walls, one at least of said closure flaps being adhered to said liner end closure within the confines of said end closure seam.

10. The carton structure claimed in claim 9 wherein the closure flap adhesively secured to the liner end closure is of generally triangular shape, and wherein the apex of the triangular flap contacts the adjoining portion of the closure seam at substantially its mid point.

11. The carton structure claimed in claim 10 wherein said triangular closure flap overlies and is secured to the side of the closure seam opposite the stiffened side thereof.

12. The carton structure claimed in claim 11 wherein a second closure flap is adhered to the stiffened side of the liner end closure.

13. The carton structure claimed in claim 12 wherein said second closure flap includes a portion extending beyond the closure seam portion on the stiffened side of the liner end closure, and wherein said second closure flap is adhesively secured to the stiffened side of the liner end closure only within the confines of the closure seam.

References Cited in the file of this patent

UNITED STATES PATENTS

| | | |
|---|---|---|
| 2,297,375 | Vogt | Sept. 29, 1942 |
| 2,367,477 | Waters | Jan. 16, 1945 |
| 2,377,533 | Waters | June 5, 1945 |
| 2,407,802 | Stotter | Sept. 17, 1946 |
| 2,428,396 | Southwick | Oct. 7, 1947 |
| 2,429,538 | Wood | Oct. 21, 1947 |
| 2,516,820 | Wilson | July 25, 1950 |

FOREIGN PATENTS

| | | |
|---|---|---|
| 620,354 | Great Britain | Mar. 23, 1949 |